H. A. MYERS.
SHIFTER.
APPLICATION FILED AUG. 6, 1914.
1,167,099.
Patented Jan. 4, 1916.
2 SHEETS—SHEET 2.
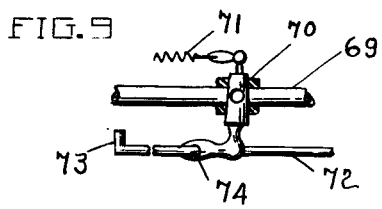
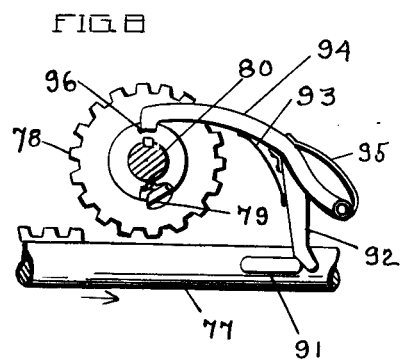
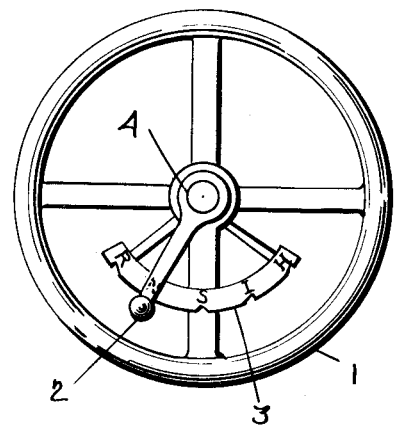
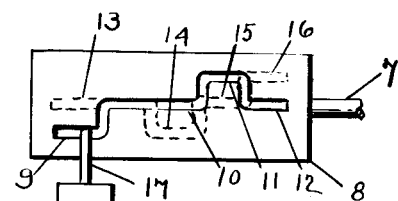
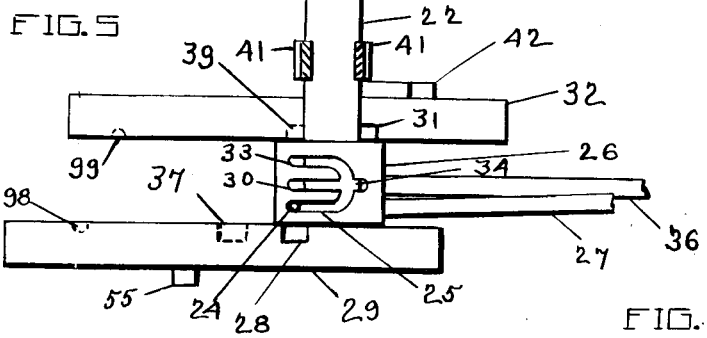
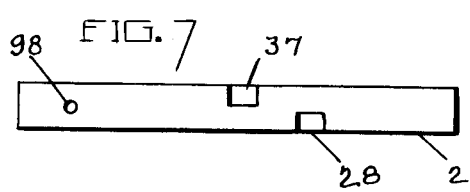
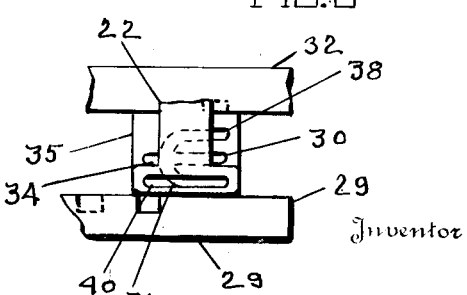

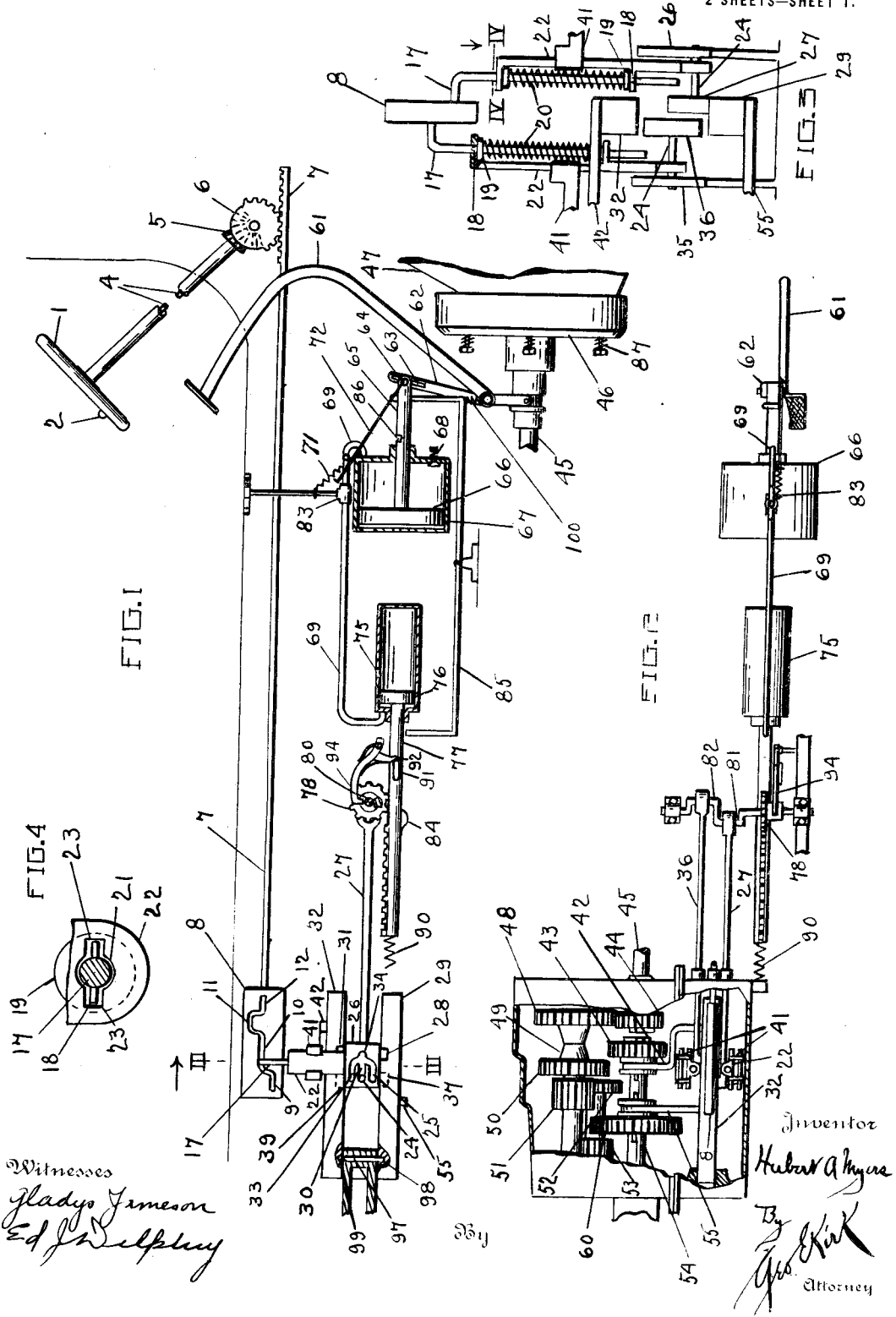
H. A. MYERS.
SHIFTER.
APPLICATION FILED AUG. 6, 1914.
1,167,099.
Patented Jan. 4, 1916.
2 SHEETS—SHEET 1.

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

SHIFTER.

1,167,099.   Specification of Letters Patent.   Patented Jan. 4, 1916.

Application filed August 6, 1914.   Serial No. 855,496.

*To all whom it may concern:*

Be it known that I, HUBERT A. MYERS, a citizen of the United States of America, residing at Toledo, Lucas county, Ohio, have invented a new and useful Shifter, of which the following is a specification.

This invention relates to devices for controlling mechanisms.

This invention has utility when incorporated for controlling the speed relations or shifting the gears of mechanisms, especially in connection with motor vehicles, as herein disclosed being designed to bring the gears to neutral and then to connecting position during the forward travel of the clutch pedal.

Referring to the drawings: Figure 1 is a fragmentary side elevation of an embodiment of the invention adapted to shift the gears in the variable speed mechanism of a motor vehicle; Fig. 2 is a plan view, with parts broken away, of the devices of Fig. 1; Fig. 3 is a section on the line III—III, Fig. 1; Fig. 4 is a section on the line IV—IV, Fig. 3, looking in the direction of the arrow; Fig. 5 is a fragmentary side elevation showing the selector and connecting means in a shifted position; Fig. 6 is a fragmentary side elevation of the guides for the connecting means; Fig. 7 is a plan view of the lower shift bar; Fig. 8 is a detail of the driving connection for operating the connecting means; Fig. 9 is a fragmentary view of the controlling valve of the energy storing device or air pump; Fig. 10 is a plan view of the steering wheel.

In the installation of the invention in connection with motor vehicles, the selector may to advantage be mounted on the steering wheel 1. To make the desired selection of driving relation for determining the speed of the vehicle, the arm 2 may be shifted to the various indications on the sector 3. This movement of the arm 2, through the rod 4 and bevel pinion 5 actuates the segmental gear 6 in mesh with the rack 7 connected to reciprocate the selector guide plate 8 which has in one side the ways 9, 10, 11, 12, respectively holding a connecting means, or rather directing a connecting means for positioning in reverse, neutral, intermediate and neutral. The opposite side of the selector plate 8 has the ways 13, 14, 15, 16, respectively directing the connecting means for positioning in neutral, slow, neutral and high.

Engaging the ways on the front side of the plate 8 is the element 17 carrying pins 18 against which are held the collars 19 by the intermediate spring 20. The element 17 extends through openings 21 in the yoke member 22, which yoke member 22 has recesses 23 allowing the pins 18 to pass through (Figs. 3, 4). Accordingly a shifting of the plate 8 to bring the upper end of the element 17 into the way 9 will cause the lower pin 18 to pass below the lower ear of the yoke member 22 and the spring 20 will thus urge the member 22 downward to carry the pin 24 into the lower way 25 of the fixed guide 26, and thus throw the oppositely toothed or hammer head of the connecting means 27 in which the pin 24 is mounted into the recess 28 of the shift bar 29. The intermediate slot or guide way 30 in the guide 26 holds the pin 24 to keep the connecting means not only free from the bar 29, but also free from entering the recess 31 in the upper shift bar 32. The upper guide way 33 in the guide 26 directs the pin 24 to move the connecting means 27 into engagement with the recess 31 in the shift bar 32. The ways 25, 30, 33, have a common junction 34, so the pin 24 may travel from one to the other. The continuous ways 13, 14, 15, 16, on the opposite side of the plate 8, also guide an element 17 operating in a yoke member 22 to control a pin 24 having a fixed guide 35 similar to the guide 26, but oppositely disposed (Fig. 6). The central way 30 therein holds the connecting means or dog 36 (Fig. 3) in disconnecting position as to the shift bars 29, 32. The lower way 37 directs the pin 24 carried by the hammer headed dog 36 to throw the lower tooth of the hammer head of the dog 36 into the recess 37 of the bar 29, while the upper way 38 directs the upper tooth of the hammer head of the dog 36 into the recess 39 of the shift bar 32.

The yokes 22 have guide slots 40 for the pins 24 fast with the dogs 27, 36. The guides 41 limit the travel of the yokes 22 to vertical reciprocations as urged by the elements 17 through the springs 20.

The bar 32 carries the arm 42 for shifting the gear 43 for direct clutch drive from the gear 44 on the shaft 45, connected by the clutch 46 (Fig. 1,) to be driven from the motor 47, say an internal combustion engine. The gear 44 is in mesh with the gear 48 on the shaft 49, and thus drives the gears 50 and 51 thereon. The gear 51 is in mesh with the gear 52 driving the reversing gear 53 (Fig. 2). Opposite direction shifting of the bar 32, instead of the direct or high speed forward drive for the driven member or shaft 54, effects intermediate or second speed forward drive therefor, by bringing the gear 43 into mesh with the gear 50.

The shift bar 29 carries the arm 55 engaging the gear 60 splined on the shaft 54, as is the gear 43. Shifting of this gear 60 forwardly brings the gear 60 into mesh with the gear 51 for slow speed forward driving, while opposite shifting of the gear 60 connects for reverse or backward travel of the vehicle by bringing the gear 60 into mesh with the gear 53. Accordingly various shifting of the bars from the neutral or disconnected positions shown in Fig. 2, brings the mechanism into different driving relations. The manually controlled element or pedal 61 is connected in its forward travel to disconnect the clutch 46 so that the shaft 45 is not driven by the motor 47.

While selection of the next speed relation desired may be made at any time from the selector, the actual connection may be made quickly and effectively without especial attention thereto, and merely by the simple operation of the clutch pedal 61.

Connected to the clutch pedal 61 to travel therewith is the arm 62 having the slot 63 engaging the pin 64 of the piston rod 65 connected to the piston 66 in the cylinder 67, in this instance forming an energy storing device and operating as an air pump. Air is admitted to the cylinder by the check valve 68. On the forward travel of the pedal 61, the piston 66 is on its compression stroke. Leading from the compression end of this single acting pump is the duct 69 having the valve 70 therein, normally held closed by the spring 71. As the piston 66 nears the end of its compression stroke, the rod 72, carried by the pin 64, has its enlarged end 73 engage the valve arm 74 to open the valve 70, and thereby allow the highly compressed air to quickly rush on through the duct 69 to the motor cylinder 75 of the stored energy using device, and actuate the piston 76 and thereby cause its rack piston rod 77 to rotate the pinion 78, which in this direction of rotation (Fig. 8) engages the spring dog 79 or one way clutch to rotate the shaft 80 for one complete rotation. The shaft 80 has cranks 81, 82, respectively for the connecting rod means or dogs 27, 36, whereby the full rotation of the shaft 80 effects a full to and fro travel of each of the connecting means 27, 36. This is done by the continuous one-direction travel of the pedal 61, one direction continuous travel of the piston 66, one direction continuous travel of the piston 76, one direction continuous rotation of the shaft 80.

With the desired manual setting of the valve 83 to regulate the flow rate of the motive fluid through the duct 69 in the operation of the pneumatic control devices, the speed of the travel of the piston 76 may be determined, and likewise the quickness with which the speed change is made.

When the piston 76 reaches the limit of its power travel, its rod 77 has the cam 84 thereon strike the U-member 85 forming locking means for the pedal 61. This striking of the member 85 by the releasing means 84, rocks the member 85 free of the notch 86 in the piston rod 65, so that the springs 87 of the clutch 46 may cause the pedal 61 to return to its initial position from the pneumatic device forward driving actuation. As the pedal 61 starts on this recover travel, the rod 72 so moves as to the valve 70 that the spring 71 may bring this valve to closed position as to the cylinder 67. This valve 70 has leakage openings of usual drip valve type as to the cylinder 75, when in this closed position as to the cylinder 67, whereby the motive fluid actuating the piston 76 may escape, and the spring 90 at once act to return the rack 77 and its piston 76 to initial position for a repetition of the cycle of operations.

In this return travel of the rod 77 by the action of the spring 90, the wheel 78 is left clear of the end of the rack on the piston rod 77. Cam 91 on this rod 77, in the return travel, rocks the hinged arm 92 against the action of the spring 93, so that the elements may move into the position shown in Fig. 8. At the limit of actuation travel of the piston 76, the dog 94, as actuated by the spring 95, entered the notch 96 to hold the shaft 80 and thereby maintain the connecting means in the shifted positions determined. The return of the rod 77 to initial position does not disturb this lock, owing to the hinge permitting swing of the arm 92. The first travel of the piston 76 causes the cam 91 to act on the arm 92 and lift the dog 94 out of the notch 96, thereby freeing the shaft 80 for the rack to drive the gear 78.

From the neutral position of the bars 29, 32, Fig. 1, but one bar may be shifted at a time, for the plunger 97 must be forced into the recess 98 of the bar 29 before the bar 32 may be moved, and similarly, bar 32 must be in position to have its recess 99 aline with the plunger 97, before the bar 29 may be shifted.

In operation, the selector arm 2, is moved from the "N" or neutral position to say "R" for reverse. This action through the segment gear 6 moves the selector guide plate 8 forward to bring the way 9 in position to be engaged by one of the elements 17, the front one in Fig. 1, while the other element 17 is held by the way 13. This means the back element 17 will hold the connecting means 36 in an intermediate position by directing the pin 24 to travel in the way 30 of the fixed guide 35, while the way 9 is tending to force the yoke 22 having the pin 24 engaging the connecting means 27 downwardly. The selection directs the driving relation.

The driving relation connection is made merely through the forward actuation of the pedal 61, so far as the driver of the vehicle need take thought thereof. This forward travel of the pedal 61 releases the clutch 46, compresses air in the cylinder 66, and as the limit of compression is reached the bar 72 trips the valve 70, permitting a rush of the motive fluid through the duct 69 to start the travel of the piston 76 in the cylinder 75.

The first movement of the piston 76, through the cam 91, lifts the dog 94 to release the shaft 80 from locking position. Continued travel of the piston 76, causes the rack 77 to engage the gear 78, which while free to rotate in the opposite direction, in this direction of travel engages the spring dog 79 to rotate the shaft 80 one full rotation. This will cause the crank 82 to reciprocate the connecting means 36, to and fro, but as the pin 24 traveling in the way 30 of the fixed guide plate 26 holds the dog of the means 36 free of each of the bars 29, 32, there is no shifting action.

The crank 81, also reciprocates the connecting means 27, first drawing the pin 24 to the junction 34, and then starting return travel of the pin. However, during the brief and relatively slow reciprocation travel of the pin near the junction 34 because the actuating arc is nearly at right angles thereto, the spring 20 acts to cause the yoke 22 to direct the pin 24 in the way 25, at once bringing the dog of the connecting means 27 into the recess 28 of the shift bar 29, and in its return travel carrying this shift bar with it. The pin 24, slides to and fro in the way 40 of the vertically reciprocable yoke 22. The bar 29 in its shifting, through the arm 55 moves the gear 60 into mesh with the gear 53, connecting the mechanism up for reverse driving, or backing of the vehicle.

As soon as the wheel 78 has made its full rotation, the dog 94 drops into the notch 96 and locks the shaft to thereby maintain the connecting means in the shifted position. Simultaneously, the cam 84 rocks the U-member 85 against the locking action of the spring 100, to free the member 85 from the notch 86, thereby allowing the piston 61 to recover its initial position for a repetition of the operations at such other selected driving relation as may be desired. As the pedal 61 recovers, the bar 72 allows the spring 71 to move the valve 70 to closed position as to the cylinder 67, and to provide leakage through the passages of usual drip valve type, as to the cylinder 75, as the spring 90 moves the piston 76 back to starting position, and the cam 91, rocks the arm 92, without throwing the dog 94 out of locking position as to the shaft 80.

What is claimed and it is desired to secure by Letters Patent is:

1. A driving member, a driven member, mechanism for establishing a plurality of driving relations therebetween, connecting means for the different driving relations, a selector for determining the connection of the connecting means, and an actuator for the connecting means including an energy converting device, a converted energy using device, and a member in its continuous travel operable through the devices to bring the connecting means to disconnecting position and then to connecting position.

2. A driving member, a driven member, mechanism for establishing a plurality of driving relations therebetween, connecting means for the different driving relations, a selector for determining the connection of the connecting means, and an actuator for the connecting means including a pump, a motor, and a member in its one direction travel operable through the pump and motor to bring the connecting means to disconnecting position and then to connecting position.

3. A driving member, a driven member, mechanism for establishing a plurality of driving relations therebetween, connecting means for the different driving relations, a selector for determining the connection of the connecting means, and an actuator for the connecting means including a rotatable member operable for a full rotation to bring the connecting means to disconnecting position and then to connecting position.

4. A driving member, a driven member, mechanism for establishing a plurality of driving relations therebetween, connecting means for the different driving relations, a selector for determining the connecting of the connecting means, and an actuator for the connecting means including an energy converting device, a converted energy using device, and a one direction driving travel member, operable through the devices during its continuous travel in the driving direction to bring the connecting means to disconnecting position and then to connecting position.

5. A driving member, a driven member, mechanism for establishing a plurality of driving relations therebetween, connecting means for determining the different driving relations of the mechanism, a driving relation selector for the connecting means, and an actuator for the connecting means including a pedal and energy converting and using devices operable from the pedal in one direction travel of the pedal to bring the connecting means to disconnecting position and then to connecting position.

6. A driving member, a driven member, mechanism for establishing a plurality of driving relations therebetween, connecting means for the different driving relations, a driving relation selector for the connecting means, and an actuator for the connecting means including a pedal and energy converting and using devices operable from the pedal in its forward travel to bring the connecting means to disconnecting position and then to connecting position.

7. A driving member, a driven member, mechanism for establishing a plurality of driving relations therebetween, connecting means for the different driving relations, a driving relation selector for the connecting means, and an actuator for the connecting means including a reciprocable element, devices connected to the element to bring the connecting means to disconnecting position and then to connecting position, and locking means for the element released by the devices.

8. A driving member, a driven member, mechanism for establishing a plurality of driving relations therebetween, connecting means for the different driving relations, and an actuator for the connecting means including a reciprocable element, devices connected to the element in its one direction travel to bring the connecting means to disconnecting position and then to connecting position, and locking means for the element holding it from recover from its driving travel.

9. A driving member, a driven member, mechanism for establishing a plurality of driving relations therebetween, connecting means for the different driving relations, and an actuator for the connecting means including a movable element, devices connected to the element in the one direction movement thereof to bring the connecting means to disconnecting position and then to connecting position, locking means for the element, and device controlled releasing means for the locking means.

10. A driving member, a driven member, mechanism for establishing a plurality of driving relations therebetween, connecting means for the different driving relations, and an actuator for the connecting means including a movable element, energy converting and using devices operable from the element in one direction movement of the element to bring the connecting means to disconnecting position and then to connecting position, and reset means for the devices.

11. A driving member, a driven member, mechanism for establishing a plurality of driving relations therebetween, connecting means for the different driving relations, and an actuator for the connecting means including an energy converting device, a device for using the converted energy to bring the connecting means to disconnecting position and then to connecting position, and an element in its one direction travel connected to operate both of said devices.

12. A driving member, a driven member mechanism for establishing a plurality of driving relations therebetween, connecting means for the different driving relations, and an actuator for the connecting means including a pedal and pneumatic pump and motor devices controlled in one direction travel of the pedal to bring the connecting means to disconnecting position and then to connecting position.

In witness whereof I affix my signature in the presence of two witnesses.

HUBERT A. MYERS.

Witnesses:
   Geo. E. Kirk,
   C. H. Rauch.